(No Model.)
J. STEWART
HAND RAKE.
No. 368,559. Patented Aug. 16, 1887.
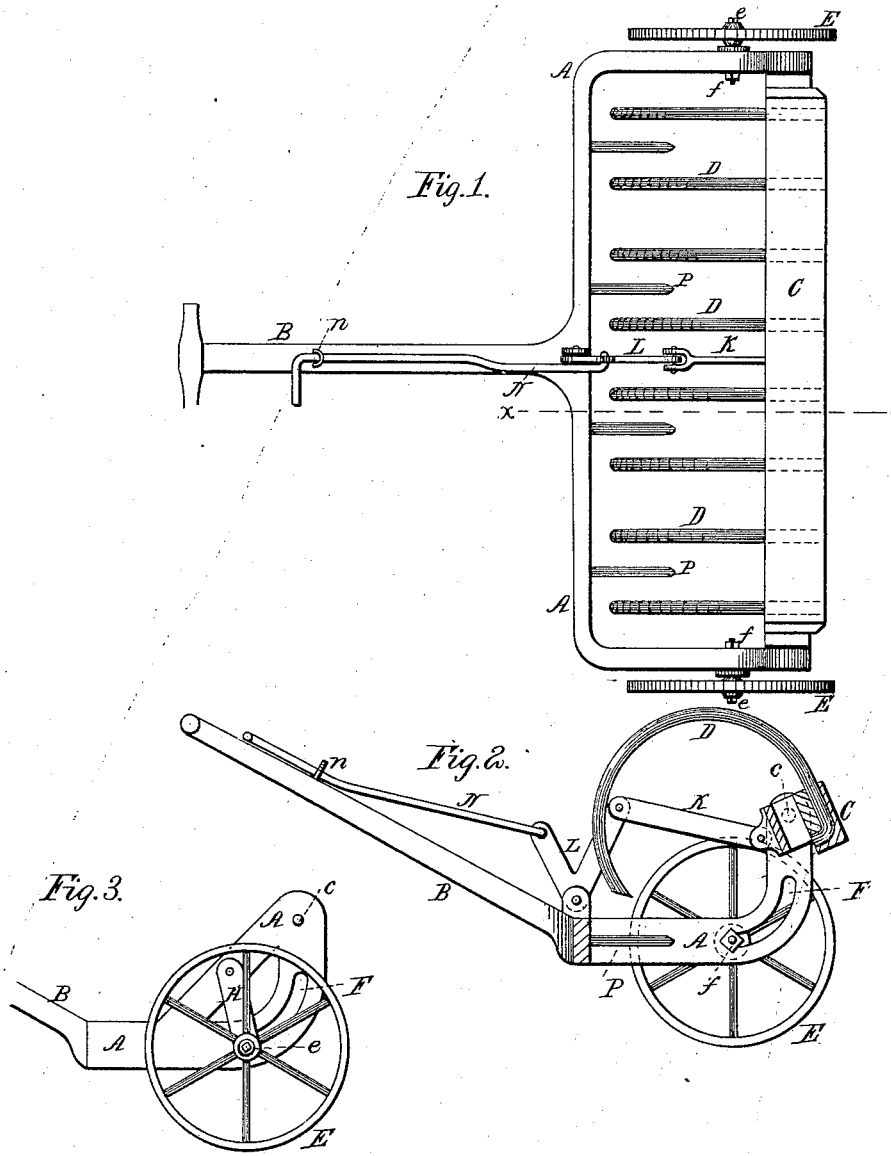
Witnesses:
W. C. Firdinston.
Edward W. Rector
Inventor
Joseph Stewart
by Stem Bick
his Attorneys.

UNITED STATES PATENT OFFICE.

JOSEPH STEWART, OF LIBERTY, INDIANA, ASSIGNOR OF ONE-THIRD TO JAMES ISRAEL, OF SAME PLACE.

HAND-RAKE.

SPECIFICATION forming part of Letters Patent No. 368,559, dated August 16, 1887.

Application filed October 19, 1885. Renewed July 25, 1887. Serial No. 245,274. (No model.)

*To all whom it may concern:*

Be it known that I, JOSEPH STEWART, a citizen of the United States, residing at Liberty, in the county of Union and State of Indiana, have invented certain new and useful Improvements in Hand-Rakes, of which the following is a full, clear, and exact description, reference being had to the accompanying drawings, forming part of this specification.

My invention relates to an improvement in wheeled hand-rakes, more especially designed for use on lawns; and its novelty will be herein set forth, and specifically pointed out in the claims.

In the accompanying drawings, Figure 1 is a top plan view of my improved rake. Fig. 2 is an end elevation in section through the line x x of Fig. 1. Fig. 3 is an end view of the wheel and frame, showing a modified form.

The same letters of reference are used to indicate identical parts in all the figures.

A A is an ordinary frame made of wood or metal.

B is the handle by which the rake is pushed instead of pulled, as in ordinary rakes.

C is a rake-head pivoted to the frame at c, so as to swing or rotate. To this rake-head are attached a number of curved rake-teeth, D, their upper portion extending, when in position to rake, toward the handle B and their lower ends curved round in an opposite direction, so that as the rake is pushed by means of the handle B the teeth gather.

The frame A is supported by two wheels, E E. These wheels are pivoted on spindles or stub axles e e, which pass through slots F in the ends of the frame A, and are held in place by nuts f. The slots F are curved, as shown, so that the axles e of the wheels may be adjusted to any point within the slots for elevating or lowering the rake, so as to bring the points of the teeth in proper relation to or position on the ground.

In Fig. 3 the frame A is shown with a brace, A', to which is pivoted an arm, H, its lower end being fastened to the axle of the wheel, thus forming an additional support. The arms H swing with the wheel as it is moved or adjusted in the slot F. To the frame A, near the middle, is pivoted a bell-crank, L, to an arm of which is pivoted the rod N, which extends out along the handle B, and may be loosely connected with it by the staple n. To the other arm of the bell-crank L is attached the rod K, which is also pivoted to the underside of the rake-head C. As the rod N is drawn backward, it turns the bell-crank L, and through the rod K rotates the rake-head C, so as to bring the teeth into the position shown in Fig. 2 to dump the load, when the rod N is pushed back and the rake-teeth restored to position to gather another load.

P P are pins or spikes to disentangle the grass from the teeth when they are lifted and cause the grass to drop down.

In the drawings the rod K is shown attached to the under side of the rake-head. Of course it may be attached to the upper side when the motion of the rods and bell-crank are reversed in dumping.

In a lawn-rake it is of great advantage to be able to push the rake instead of pull it, as it works easily, and the operator can always see it work.

Having thus fully described my invention, I claim—

1. In a wheeled hand-rake, the frame A, carrying the rake-head and arranged to be propelled from the rear, in combination with the bell-crank L, rod K, connected to the rake-head, and rod N, extending from the bell-crank back along the handle, whereby the rake may be dumped by the operator pushing the rake from the rear, substantially as described.

2. In a wheeled hand-rake for lawns, arranged to be propelled from the rear, as described, a system of rods and levers or crank for raising and lowering the teeth connected with the handle in the rear of the rake, substantially as described.

3. In a wheeled hand-rake, the frame A, extending in the rear of the rake and provided with slots F, curving upward and forward, substantially as described.

4. In a wheeled hand-rake, the wheels E E, rotating on stub-axles, said axles arranged to move in the slots F and supported by the radial arms H H, pivoted to the frame A, substantially as described.

JOSEPH STEWART.

Witnesses:
  S. B. RUDE,
  JAMES ISRAEL.